(12) United States Patent
Matsuda

(10) Patent No.: US 10,359,675 B2
(45) Date of Patent: Jul. 23, 2019

(54) LIQUID CRYSTAL DISPLAY PANEL

(71) Applicant: SAKAI DISPLAY PRODUCTS CORPORATION, Sakai-shi, Osaka (JP)

(72) Inventor: Masahiro Matsuda, Sakai (JP)

(73) Assignee: Sakai Display Products Corporation, Sakai-shi, Osaka (JP)

( * ) Notice: Subject to any disclaimer, the term of this patent is extended or adjusted under 35 U.S.C. 154(b) by 0 days.

(21) Appl. No.: 15/700,900

(22) Filed: Sep. 11, 2017

(65) Prior Publication Data

US 2017/0371216 A1 Dec. 28, 2017

Related U.S. Application Data

(63) Continuation of application No. PCT/JP2015/057185, filed on Mar. 11, 2015.

(51) Int. Cl.
*G02F 1/1362* (2006.01)
*G09G 3/36* (2006.01)

(52) U.S. Cl.
CPC .. *G02F 1/136286* (2013.01); *G02F 1/136213* (2013.01); *G09G 3/36* (2013.01);
(Continued)

(58) Field of Classification Search
CPC ......... G02F 1/136286; G02F 1/136213; G02F 2201/123; G02F 1/1362; G09G 3/3655; G09G 3/36; G09G 2300/0876
See application file for complete search history.

(56) References Cited

U.S. PATENT DOCUMENTS 9,229,284 B2 * 1/2016 Uchida ................ G09G 3/3655
9,778,526 B2 * 10/2017 Huang ................ G02F 1/13624
(Continued)

FOREIGN PATENT DOCUMENTS

JP 11-202367 A 7/1999
JP 2008-003380 A 1/2008
(Continued)

OTHER PUBLICATIONS

U.S. Appl. No. 15/100,206, filed May 27, 2016.
Int'l. Search Report issued in Int'l. App. No. PCT/JP2015/057185, dated May 26, 2015.

*Primary Examiner* — Hoan C Nguyen
(74) *Attorney, Agent, or Firm* — Green Burns & Crain, Ltd.

(57) ABSTRACT

The liquid crystal display panel includes: storage capacitors respectively provided for a plurality of pixels on a substrate; a plurality of storage capacitor lines 37 arrayed in a column direction and each connected to corresponding ones of the storage capacitors, each storage capacitor line 37 belonging to one of N groups (where N is an integer equal to or greater than 2), such that every $N^{th}$ storage capacitor line 37 belongs to an identical group; a plurality of branch lines 38 arrayed in a row direction, each branch line 38 being connected to more than one of the plurality of storage capacitor lines 37 that belong to an identical group; a plurality of trunk lines 71 to 82 at a column-direction edge of the substrate, each supplying an identical signal to a number of storage capacitor lines 37 that belong to one of the N groups via one or more of the plurality of branch lines 38; and a plurality of signal sending sections 7 each being coupled to associated trunk lines among the plurality of trunk lines 71 to 82. The associated trunk lines coupled to each of the plurality of signal sending sections 7 include a plurality of subsections in each of which mutually different trunk lines are arrayed
(Continued)

in the column direction; in each of the plurality of subsections, two or more of the plurality of branch lines 38 that are connected to storage capacitor lines 37 belonging to respectively different groups are connected to corresponding trunk lines, the two or more branch lines 38 constituting a unit that corresponds to the respective subsection; and for each of the plurality of signal sending sections 7, the plural units of the two or more branch lines 38 that are coupled thereto are respectively connected to storage capacitor lines 37 belonging to different sets of groups.

15 Claims, 9 Drawing Sheets

(52) U.S. Cl.
CPC ..... *G09G 3/3655* (2013.01); *G02F 2201/123* (2013.01); *G09G 2300/0876* (2013.01)

(56) References Cited

U.S. PATENT DOCUMENTS

| | | | |
|---|---|---|---|
| 9,785,027 B2* | 10/2017 | Hirata | G02F 1/136286 |
| 2001/0022572 A1 | 9/2001 | Murade | |
| 2007/0182909 A1* | 8/2007 | Kim | G02F 1/1345 |
| | | | 349/149 |
| 2009/0231532 A1 | 9/2009 | Yoshida | |
| 2011/0285612 A1 | 11/2011 | Yamashita | |
| 2012/0057091 A1 | 3/2012 | Kawabata et al. | |
| 2013/0321730 A1 | 12/2013 | Huang | |
| 2015/0044789 A1 | 2/2015 | Yamada | |

FOREIGN PATENT DOCUMENTS

| | | |
|---|---|---|
| JP | WO 2007-135893 A1 | 10/2009 |
| WO | WO 2010-087049 A1 | 8/2010 |
| WO | WO 2010/134439 A1 | 11/2010 |
| WO | WO 2012-157725 A1 | 11/2012 |

* cited by examiner

LIQUID CRYSTAL DISPLAY PANEL

This is a continuation of International Application No. PCT/JP2015/057185, with an international filing date of Mar. 11, 2015, the entire contents of which are hereby incorporated by reference.

BACKGROUND OF THE INVENTION

1. Field of the Invention

The present invention relates to a liquid crystal display panel, and more particularly to a liquid crystal display panel which is adapted for a narrow-frame construction.

2. Description of the Related Art

In the pixel region of a liquid crystal display panel (hereinafter referred to as a display panel) of a liquid crystal display device, a plurality of pixels are arranged in a matrix of rows and columns. Usually, within one pixel, two subpixels are provided for each color, the two subpixels being associated with different effective voltages to be applied across the liquid crystal layer. The two subpixels have different storage capacitors provided therefor, with an oscillating voltage being applied to each storage capacitor. The voltages applied to the storage capacitors are opposite to each other in polarity, whereby the respective subpixels can be made brighter or darker.

The storage capacitor of each subpixel is connected to one of a plurality of storage capacitor lines that are arrayed in a column direction. The storage capacitor line may be connected to trunk lines which are provided at both ends of its row direction, for example. A signal may be sent to the storage capacitor via the trunk lines and the storage capacitor line.

FIG. 10 is an explanatory diagram schematically showing a connection structure between storage capacitor lines and trunk lines of a conventional display panel.

As shown in FIG. 10, storage capacitor lines 37 are arrayed in the column direction of a display panel. Each storage capacitor line 37 is connected to the respective storage capacitors of subpixels that, are arrayed in the column direction of the display panel. As shown in FIG. 10, at both side edges of the row direction of the display panel, trunk lines 71, 72, 73 and 74 are arrayed in the row direction of the display panel. In this display panel, the plurality of storage capacitor lines are arrayed in the column direction in such a manner that every fourth storage capacitor lines are connected to the same trunk line.

The trunk lines 71, 72, 73 and 74 are each connected to a storage capacitor signal control section 7 which sends signals for the storage capacitors. From the storage capacitor signal control section 7, signals are sent to the storage capacitors via the trunk lines 71, 72, 73 and 74 and the storage capacitor lines 37. The fact that signals are sent to the trunk lines 71, 72, 73 and 74 from the upper side of the display panel means there being longer paths to the respective storage capacitors via the lower storage capacitor lines 37 (and hence resulting in higher resistances) than via the upper storage capacitor lines 37. In display panels, rectangular waves are used as the storage capacitor signals. Rectangular waves of signals on the lower storage capacitor lines 37 are susceptible to the "waveform blunting" phenomenon, where delays occur in the waveform.

Although FIG. 10 illustrates an example where there are four kinds of signals, when the oscillation period is made longer in order to suppress waveform blunting, a greater variation, e.g., 12 kinds, of signals will be introduced. In order to reduce the storage capacitor line resistance, on the other hand, the trunk lines will be made thicker. In the former case, although the line width of each trunk line may be small, spaces will be needed between trunk lines, thus requiring a larger region for the trunk lines to be installed as the number of trunk lines increases. Therefore, in either case, the region in which trunk lines are installed is increased, thus resulting in a problem of increased frame size of the display panel.

International Publication No. 2010/134439 (hereinafter "Patent Document 1") discloses a display panel in which a plurality of storage capacitor lines are arrayed in the column direction of the pixel region and a plurality of branch lines are arrayed in the row direction, where the branch lines are connected to a control signal supplying section so that signals are sent irons the branch lines to storage capacitors via the storage capacitor lines.

FIG. 11 is an explanatory diagram schematically showing a connection structure between storage capacitor lines, branch lines, and trunk lines of the display panel of Patent Document 1.

In this display panel, storage capacitor lines 37, each belonging to one of 12 groups A, B, C, D, E, F, G, H, J, K, L and M, are arrayed in the column direction; and a plurality of branch lines 38 are arrayed in the row direction. The branch lines 38 are respectively connected to the storage capacitor lines 37 of groups A, B, C, D, B, F, G, H, J, K, L and M, from the leftmost one in FIG. 11 first. At an edge of the display panel in the column direction, trunk lines a, b, c, d, e, f, g, h, j, k, l and m are arrayed in the column direction, the branch lines 38 being respectively connected to the trunk lines a, b, c, d, e, f, g, h, j, k, l and m. The trunk lines a, b, c, d, e, f, g, h, j, k, l and m are connected to a storage capacitor signal control section 7.

In this display panel, there are 12 kinds of signals; 12 kinds of trunk lines are provided correspondingly; and there are 12 kinds of branch lines. This allows the respective signals to be supplied to the storage capacitor lines respectively belonging to the 12 groups, via corresponding trunk lines and branch lines.

This display panel allows the loads on the storage capacitor lines and the branch lines to be reduced, and thus allows the line widths of the trunk lines to be thinner, whereby a narrow frame can be realized.

In the display panel of Patent Document 1, the trunk lines can be made thinner to achieve a reduced area. As the display panel increases in size, however, a greater variety of CS signals need to be introduced as shown in FIG. 11 in order to suppress waveform blunting; this causes the number of trunk lines to be increased, thus resulting in a problem in that the trunk line area cannot be made sufficiently narrow after all.

SUMMARY OF THE INVENTION

The present invention has been made in view of the above circumstances, and an objective thereof is to provide a liquid crystal display panel having good display quality which, when waveform blunting of the rectangular waves of signals is suppressed by introducing a greater variety of signals, etc., it is possible to reduce the footprint of trunk lines (i.e., the width of the region in which they are installed) for the storage capacitors of each pixel, whereby a narrow-frame construction is made possible and display unevenness due to signal delays is suppressed.

A liquid crystal display panel according to an embodiment of the present invention comprises: storage capacitors respectively provided for a plurality of pixels arranged in a matrix shape on a substrate; a plurality of storage capacitor lines arrayed in a column direction and each connected to corresponding ones of the storage capacitors, each storage capacitor line belonging to one of N groups (where N is an integer equal to or greater than 2), such that every $N^{th}$ storage capacitor line belongs to an identical group; a plurality of branch lines arrayed in a row direction, each branch line being connected, to more than one of the plurality of storage capacitor lines that belong to an identical group; a plurality of trunk lines at a column-direction edge of the substrate, each supplying an identical signal to a number of storage capacitor lines that belong to one of the N groups via one or more of the plurality of branch lines; and a plurality of signal sending sections each being coupled to associated trunk lines among the plurality of trunk lines, wherein, the associated trunk lines coupled to each of the plurality of signal sending sections include a plurality of subsections in each of which mutually different trunk lines are arrayed in the column direction; in each of the plurality of subsections, two or more of the plurality of branch lines that are connected to storage capacitor lines belonging to respectively different groups are connected to corresponding trunk lines, the two or more branch lines constituting a unit that corresponds to the respective subsection; and for each of the plurality of signal sending sections, the plural units of the two or more branch lines that are coupled thereto are respectively connected to storage capacitor lines belonging to different sets of groups.

In an embodiment of the present invention, not trunk lines corresponding to all groups are arrayed in the column direction; rather, a plurality of subsections exist, in each of which mutually different trunk lines (that correspond to fewer than all groups) are arrayed in the column direction. As a result, the number of trunk lines that are arrayed in the column direction is decreased, and thus the footprint of the trunk lines can be reduced while introducing a greater variety of storage capacitor signals to suppress waveform blunting.

In one embodiment, there are fewer trunk lines adjoining one another in the column direction in each of the plurality of subsections than there are the associated trunk lines coupled to each of the plurality of signal sending sect ions.

In an embodiment of the present invention, the footprint of the trunk lines can be reduced.

In one embodiment of the present invention, the N groups are 12 groups; the plural units are three units, and the branch lines connected to the storage capacitor lines belonging to the 12 groups constitute a total of six units; and the associated trunk lines coupled to each of the plurality of signal sending sections are six associated trunk lines, and the plurality of signal sending sections coupled to the storage capacitor lines belonging to the 12 groups are two signal sending sections.

In an embodiment of the present invention, there are 12 groups. As a result, even when the liquid crystal display panel is increased in size, waveform blunting of storage capacitor signals is well suppressed.

In one embodiment, the trunk lines adjoining one another in the column direction in each of the plurality of subsections are consecutively designated as a first line portion, a second line portion, a third line portion, and a fourth line portion in the column direction, and the plurality of subsections are consecutively designated as a first subsection, a second subsection, and a third subsection in the row direction; the second line portion in the first subsection and the first line portion in the second subsection are parts of a same trunk line; the third line portion in the first subsection, the second line portion in the second subsection, and the first line portion in the third subsection are parts of a same trunk line; the fourth line portion in the first subsection, the third line portion in the second subsection, and the second line portion in the third subsection are parts of a same trunk line; the fourth line portion in the second subsection and the third line portion in the third subsection are parts of a same trunk line; the first line portions in the first subsection, the second subsection, and the third subsection adjoin in the row direction; the second line portions in the first subsection, the second subsection, and the third subsection adjoin in the row direction; the third line portions in the first subsection, the second subsection, and the third subsection adjoin in the row direction; the fourth line portions in the first subsection, the second subsection, and the third subsection adjoin in the row direction; and each branch line composing the plural units intersects four trunk lines.

In an embodiment of the present invention, the footprint of the trunk lines can be reduced. Moreover, the number of trunk lines intersected by the branch lines composing each unit is always four, whereby all groups can be equalized in capacitance.

In one embodiment, the plurality of subsections are consecutively designated as a first subsection, a second subsection, and a third subsection in the row direction; the trunk lines adjoining one another in the column, direction in each of the first subsection and the third subsection are consecutively designated as a first line portion, a second line portion, and a third line portion in the column direction; the trunk lines adjoining each other in the column direction in the second subsection are consecutively designated as a first line portion and a second line portion in the column direction; and the first line portion in the second subsection and the third line portion in the first subsection are parts of a same trunk line, and the first line portion in the second subsection and the first line portion in the first subsection adjoin in the row direction; and the second line portion in the second subsection and the first line portion in the third subsection are parts of a same trunk line, and the second line portion in the second subsection and the third line portion in the third subsection adjoin in the row direction.

In an embodiment of the present invention, the footprint of the trunk lines can be further reduced.

In one embodiment, the N groups are 12 groups; the plural units are two units, and the branch lines connected to the storage capacitor lines belonging to the 12 groups constitute a total of six units; and the associated trunk lines coupled to each of the plurality of signal sending sections are four associated trunk lines, and the plurality of signal sending sections coupled to the storage capacitor lines belonging to the 12 groups are three signal sending sections.

In one embodiment, the trunk lines adjoining each other in the column direction in each of the plurality of subsections are consecutively designated as a first line portion and a second line portion in the column direction, and the plurality of subsections are consecutively designated as a first subsection and a second subsection in the row direction; the first line portions in the first subsection and the second subsection adjoin in the row direction; the second line portions in the first subsection and one second subsection adjoin in the row direction; and each branch line composing the plural units intersects two trunk lines.

A liquid crystal display panel according to an embodiment of the present invention comprises: storage capacitors respectively provided for a plurality of pixels arranged in a matrix shape on a substrate; a plurality of storage capacitor lines arrayed in a column direction and each connected to corresponding ones of the storage capacitors, each storage capacitor line belonging to one of N groups (where N is an integer equal to or greater than 2), such that every $N^{th}$ storage capacitor line belongs to an identical group, a plurality of branch lines arrayed in a row direction, each branch line being connected to more than one of the plurality of storage capacitor lines that belong to an identical group; a plurality of trunk lines at a row-direction edge of the substrate, each supplying an identical signal to a number of storage capacitor lines that belong to one of the N groups; and a plurality of signal sending sessions each being coupled to associated trunk lines among the plurality of trunk lines, wherein, the associated trunk lines coupled to each of the plurality of signal sending sections include a plurality of subsections in each of which mutually different trunk lines are arrayed in the row direction; and in each of the plurality of subsections, storage capacitor lines belonging to respectively different groups among the N groups are connected to corresponding trunk lines.

In an embodiment of the present invention, as opposed to a construction where trunk lines corresponding to all groups are arrayed in the row direction; rather, a plurality of subsections exist, in each of which mutually different trunk lines (that correspond to fewer than all groups) are arrayed in the row direction. As a result, the number of trunk lines that, are arrayed in the row direction is decreased, and thus the footprint of the trunk lines can be reduced while introducing a greater variety of storage capacitor signals to suppress waveform blunting.

In one embodiment, there are fewer trunk lines adjoining one another in the row direction in each of the plurality of subsections than there are the associated trunk lines coupled to each of the plurality of signal sending sections.

In an embodiment of the present invention, the footprint of the trunk lines can be further reduced.

In one embodiment, the two or more branch lines composing each of the plural units each intersect an equal number of trunk lines.

In one embodiment, all of the branch lines composing the plural units each intersect an equal number of trunk lines.

In an embodiment of the present invention, all groups can be equalized in capacitance.

In one embodiment, the two or more branch lines composing each of the plural units include two branch lines that are connected to storage capacitor lines belonging to one of the N groups.

In an embodiment of the present invention, furthermore, among the branch lines composing each unit, the number of branch lines that are connected to storage capacitor lines belonging to any one of the N groups is small, whereby display unevenness due to delays of storage capacitor signals can be suppressed.

In one embodiment, the plurality of storage capacitor lines include a plurality of sets which are arrayed in the column direction, such that storage capacitor lines respectively belonging to the N groups are arrayed in a predetermined order in each of the plurality of sets.

In one embodiment, the two or more branch lines composing each of the plural units are connected to two or more consecutive storage capacitor lines in each of the plurality of sets.

According to the present invention, not trunk lines corresponding to all groups that are provided at a column-direction edge of the display panel are arrayed in the column direction; rather, a plurality of subsections exist, in each of which mutually different trunk lines (that correspond to fewer than all groups) are arrayed in the column direction. As a result, the number of trunk lines that arrayed in the column direction is decreased. Alternatively, not trunk lines corresponding to all groups that are provided at a row-direction edge of the display panel are arrayed in the row direction; rather, a plurality of subsections exist, in each of which mutually different trunk lines (that correspond to fewer than all groups) are arrayed in the row direction. As a result, the number of trunk lines that are arrayed in the row direction is decreased. Thus, while introducing a greater variety of storage capacitor signals to suppress waveform blunting, the width of the region in which the trunk lines installed can be reduced.

DETAILED DESCRIPTION OF PREFERRED EMBODIMENTS

Hereinafter, embodiments of the present invention will be specifically described with reference to the drawings.

Embodiment 1

Figure 1:
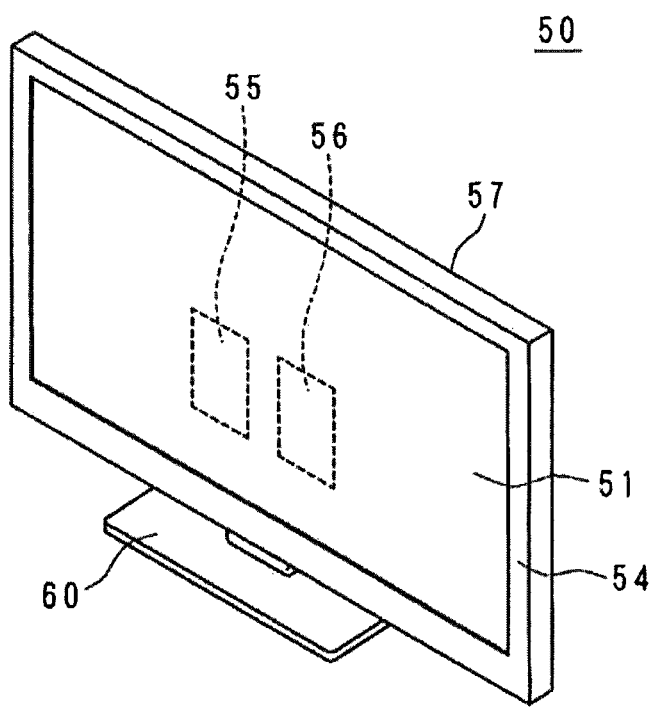
FIG. 1 is an outer perspective view of a liquid crystal display device having a display panel according to Embodiment 1 of the present invention.
Figure 2:
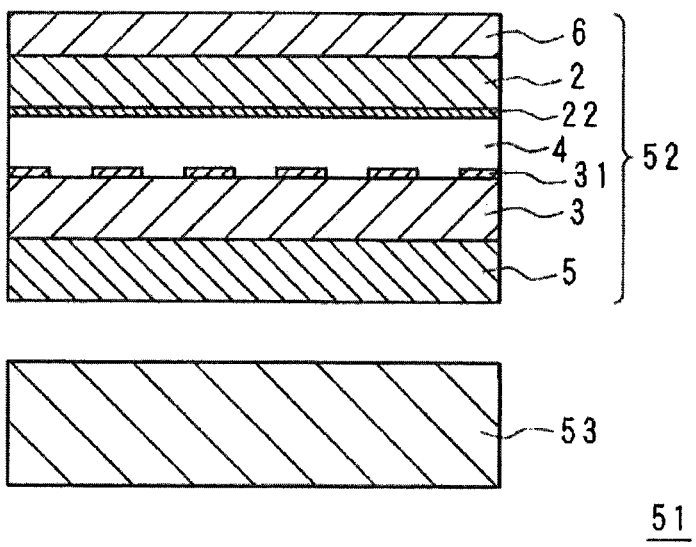
FIG. 2 is a schematic cross-sectional view showing a display module of a liquid crystal display device according to Embodiment 1 of the present invention.

FIG. 1 is an outer perspective view of a liquid crystal display device 50 having a display panel according to Embodiment 1 of the present invention, FIG. 2 is a schematic cross-sectional view showing a display module 51 of the liquid crystal display device 50.

The liquid crystal display device 50 includes: a display module 51 having a display panel 52 and a backlight unit 53; a front cabinet 54 and a rear cabinet 57 accommodating the display module 51 in a manner of sandwiching it, the cabinets 54 and 57 being made of a synthetic resin; a tuner 55 which receives a broadcast wave from an antenna (not shown); a decoder 56 which decodes an encoded broadcast wave; and a stand 60. As a whole, the display module 51 presents the shape of a substantially rectangular solid which is wider than taller, and is accommodated between the front cabinet 54 and the rear cabinet 57 in an upright attitude.

The display panel 52 includes an active matrix substrate (a TFT (thin film transistor) substrate) 3, a CF substrate 2, a liquid crystal layer 4, and two polarizers 5 and 6. The TFT substrate 3 and the CF substrate 2 are attached together via a sealing member, and a liquid crystal material is injected therebetween to form the liquid crystal layer 4. As a method of forming the liquid crystal layer 4, a one drop filling method may be adopted, where a liquid crystal material is added dropwise within the frame of a seal pattern on one of the substrates which is yet to be laid upon another; and thereafter the other substrate is laid on the one substrata bonded under a reduced pressure, and the two are bended together.

The TFT substrate 3 is obtained by, for example, forming on an electrically-insulative substrate of glass (not shown below) the following: TFTs, a plurality of gate lines (scanning lines) to supply scanning signals to the TFTs, and a plurality of source lines (signal lines) to supply display signals to the TFTs. Pixel electrodes 31 of ITO or the like are formed on its surface.

The CF substrate 2 is obtained by, for example, forming a black matrix (BM) on an electrically-insulative substrate of glass (not shown below), and arraying color filters of R (red), G (green), and B (blue). A common electrode 22 of ITO or the like is formed on its surface.

The two polarizers 5 and 6 are provided on the side of, respectively, the TFT substrate 3 and the CF substrate 2 that is opposite from the liquid crystal layer 4. The polarizers 5 and 6 are each obtained by covering both surfaces of a polarizing element with protection films, the polarizing element being made of a PVA film or the like.

The backlight unit 53 is provided on the rear surface side of the display panel 52. The backlight unit 53 may be either an edgelight type (sidelight type or light guiding plate type) or a direct type. In the case of an edgelight type, the backlight unit 53 is composed of an optical sheet, a light guiding plate, and light sources such as LED substrates that are accommodated in a chassis.

The display panel 52 is of an active matrix type. The display panel 52 includes a pixel region in which a plurality of pixels 1 are arrayed in the form of a lattice. For example, the pixel region may have 1920 pixels 1 arranged in the row direction and 1080 pixels 1 arranged in the column direction.

Figure 3:
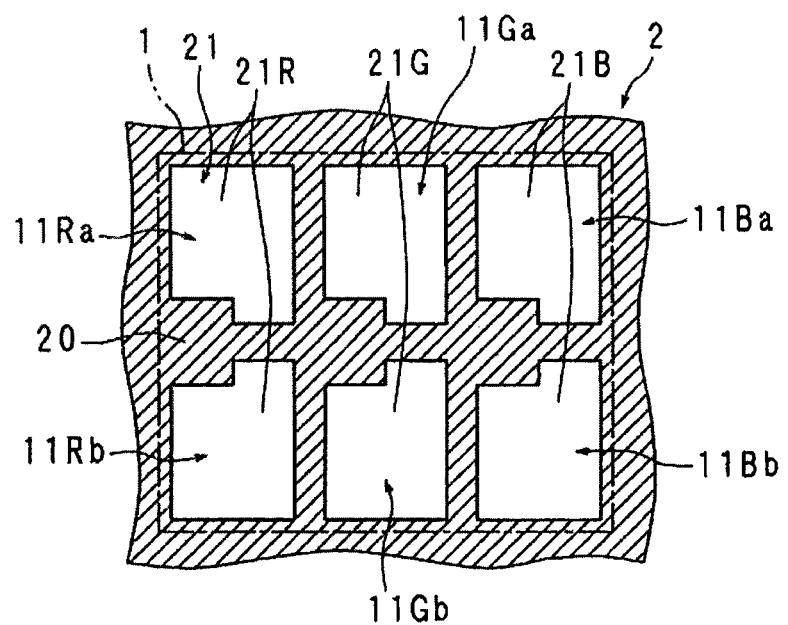
FIG. 3 is an explanatory diagram showing a pixel construction.

FIG. 3 is an explanatory diagram showing the construction of a pixel FIG. 3 is an enlarged view of a portion of the CF substrate 2 in FIG. 2 that corresponds to a pixel 1, as viewed from the front side. In FIG. 3, polarizing filters and the base of the CF substrate 2 are omitted from illustration.

The pixel 1 is composed of six subpixels 11Ra, 11Rb, 11Ga, 11Gb, 11Ba and 11Bb. The subpixels 11Ra and 11Rb are red subpixels; the subpixels 11Ga and 11Gb are green subpixels; and the subpixels 11Ba and 11Bb are blue subpixels.

As shown in FIG. 3, color filters 21 of the CF substrate 2 include filters 21R, 216 and 21B and a black matrix 20. Each of the red filter 21R, the green filter 21G, and the blue filter 21B is a strip-shaped filter having a length spanning the vertical direction of the pixel region (parallel to the short side of the CF substrate 2) and a width equal to that of a subpixel 11. The filters 21R, 21G and 21B are provided side by side, in a manner of cycling in the order of RGBRGB . . . , along the horizontal direction of the CF substrate 2 (parallel to the long side of the CF substrate 2). The black matrix 20 may be a synthetic resin film containing carbon black, for example, and is formed so as to have substantially rectangular apertures in places corresponding to the subpixels 11, thus preventing light from passing through the interspaces between the subpixels 11. As a result, as viewed from the front side, the red filter 21R is visible in places corresponding to the subpixels 11Ra and 11Rb, the green filter 21G is visible in places corresponding to the subpixels 11Ga and 11Gb, and the blue filter 21B is visible in places corresponding to the subpixels 11Ba and 11Bb.

Figure 5:
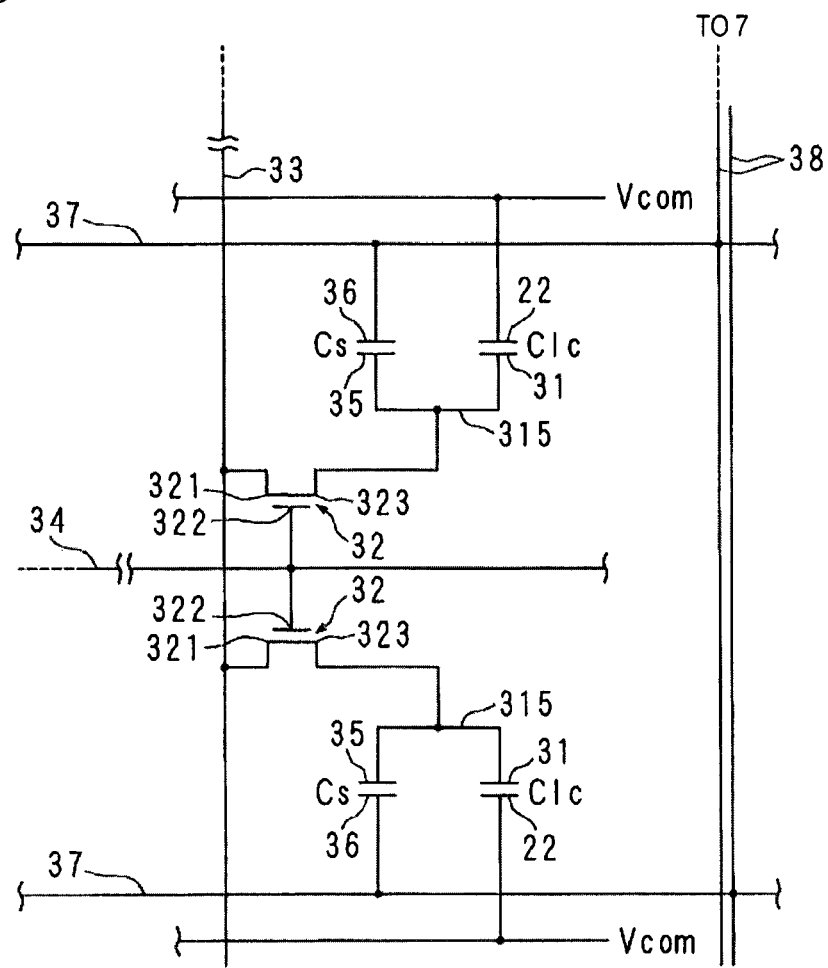
FIG. 5 is a diagram showing a circuit construction of elements, including pixel electrodes, that are formed on a TFT substrate.

Over the color filters 21 of the CF substrate 2, a counter electrode 22 is formed which is connected to a cordon voltage Vcom (see FIG. 5).

Figure 4:
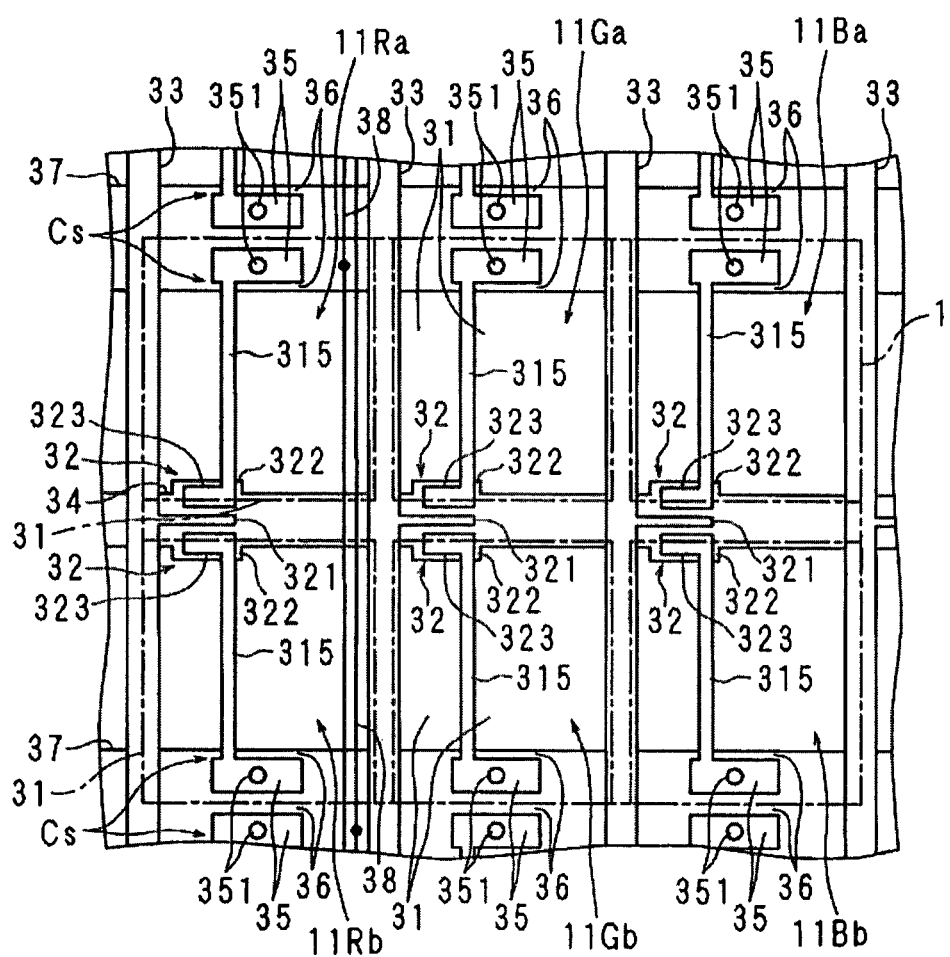
FIG. 4 is an explanatory diagram schematically showing elements, including pixel electrodes, that are formed on a TFT substrate.

FIG. 4 is an explanatory diagram schematically showing elements, including pixel electrodes 31, that are formed on the TFT substrate 3. FIG. 5 is a diagram showing a circuit construction of elements, including the pixel electrodes 31, that are formed on the TFT substrate 3. FIG. 4 shows enlarged a portion corresponding to a pixel 1 as viewed through the alignment film (the front side).

As shown in FIG. 4, the TFT substrate 3 includes pixel electrodes 31 respectively corresponding to the subpixels 11 in the pixel 1, the pixel electrodes 31 being made of a transparent electrically conductive material such as ITO (indium tin oxide). On the electrically-insulative substrate of the TFT substrate 3, a thin film transistor (TFT) 32 and a storage capacitor Cs are formed so as to correspond to each pixel electrode 31, with source lines 33, gate lines 34, storage capacitor lines 37, and branch lines 38 being formed which supply signals to the respective TFTs 32 and storage capacitors Cs.

TFTs 32 are formed between subpixels of each color, e.g., between the subpixels 11Ra and 11Rb (or between the subpixels 11Ga and 11Gb, or between the subpixels 11Ba and 11Bb), so as to be closer to one end. Each TFT 32 includes a source electrode 321, a gate electrode 322, and a drain electrode 323.

Storage capacitors Cs are formed by the upper or lower outside end of two subpixels of each color, e.g., subpixels 11Ra and 11Rb (or subpixels 11Ga and 11Gb, or subpixels 11Ba and 11Bb). Each storage capacitor Cs is composed by storage capacitor electrodes 35 and 36 which are opposed to each other via an electrically insulative film.

Each gate line 34 is provided so as to traverse the central portion of the column direction of each pixel 1, so as to extend along the row direction. The gate lines 34 are formed on the electrically-insulative substrate. An edge of each gate line 34 protrudes along the column direction to form the gate electrode 322. The gate lines 34 are connected to a gate driver (not shown) outside of the TFT substrate 3.

The source lines 33 are provided in between subpixels, so as to extend along the column direction. At a portion of each source line 33 that corresponds to the gap between pixel electrodes 31, the source electrode 321 protrudes from the central portion thereof so as to extend along the row direction. The source lines 33 are connected to a source driver (not shown) outside of the TFT substrate 3.

The storage capacitor lines 37 are provided between pixels, thus alternating with the gate lines 34 along the column direction. The storage capacitor lines 37 are formed on the electrically-insulative substrate.

Each branch line 38 is arranged to extend through the subpixels 11Ra and 11Rb in the respective pixel 1. The branch lines 38 are made of a metal material, as are the source lines 33. Periodically at every plural rows, the branch line 38 is connected to a storage capacitor line 37 via a contact hole. As will be described later, the branch line 38 connects between storage capacitor lines 37 and a trunk line. Alternatively, the branch line 38 may be arranged to extend through the subpixels 11Ga and 11Gb.

The drain electrode 323 of each TFT 32 extends along the row direction so as to be opposed to the source electrode 321, the grain electrode 323 being formed over the gate line 34 via an electrically insulative film.

Each storage capacitor electrode 35 is formed over a storage capacitor line 37 via an electrically insulative film. Each storage capacitor electrode 35 is electrically connected to a pixel electrode 31 through a contact hole 351 penetrating through the interlevel dielectric film. Each storage capacitor electrode 36 is a portion of the storage capacitor line 37 that is opposed to the storage capacitor electrode 35.

Each drain electrode 323 is connected to a storage capacitor electrode 35 via a lead line 315. Furthermore, the drain electrode 323 is electrically connected to a pixel electrode 31 via the storage capacitor electrode 35.

With the pixel electrodes 31, TFTs 32, and storage capacitors Cs of the above construction, as the TFTs 32 in each row are turned ON in a row-by-row manner via the gate lines 34, control signals are supplied to the pixel electrodes 31 in each row via the source lines 33. A voltage (control signal information) that is applied to the respective liquid crystal capacitor via each pixel electrode 31 is retained by the storage capacitor Cs. As a result of this, the amounts of light transmitted through the liquid crystal layer correspond to the subpixels of respective colors 11Ra, 11Rb, 11Ga, 11Gb, 11Ba and 11Bb are adjusted, whereby an image is rendered with fine gray scale nuances in the color and luminance of each pixel 1.

According to Embodiment 1, in subpixels of each color, e.g., subpixels 11Ra and 11Rb (or subpixels 11Ga and 11Gb, or subpixels 11Ba and 11Bb), signals which undergo changes in signal voltage in opposite directions but by the same amount of change are sent to the storage capacitor electrodes 36 of the respective storage capacitors Cs, whereby different luminance levels result in the subpixels of each color, e.g., subpixels 11Ra and 11Rb (or subpixels 11Ga and 11Gb, or subpixels 11Ba and 11Bb). This enables finer luminance adjustments for realizing richer intermediate gray scale nuances, thus contributing to improved viewing angle characteristics.

Figure 6:
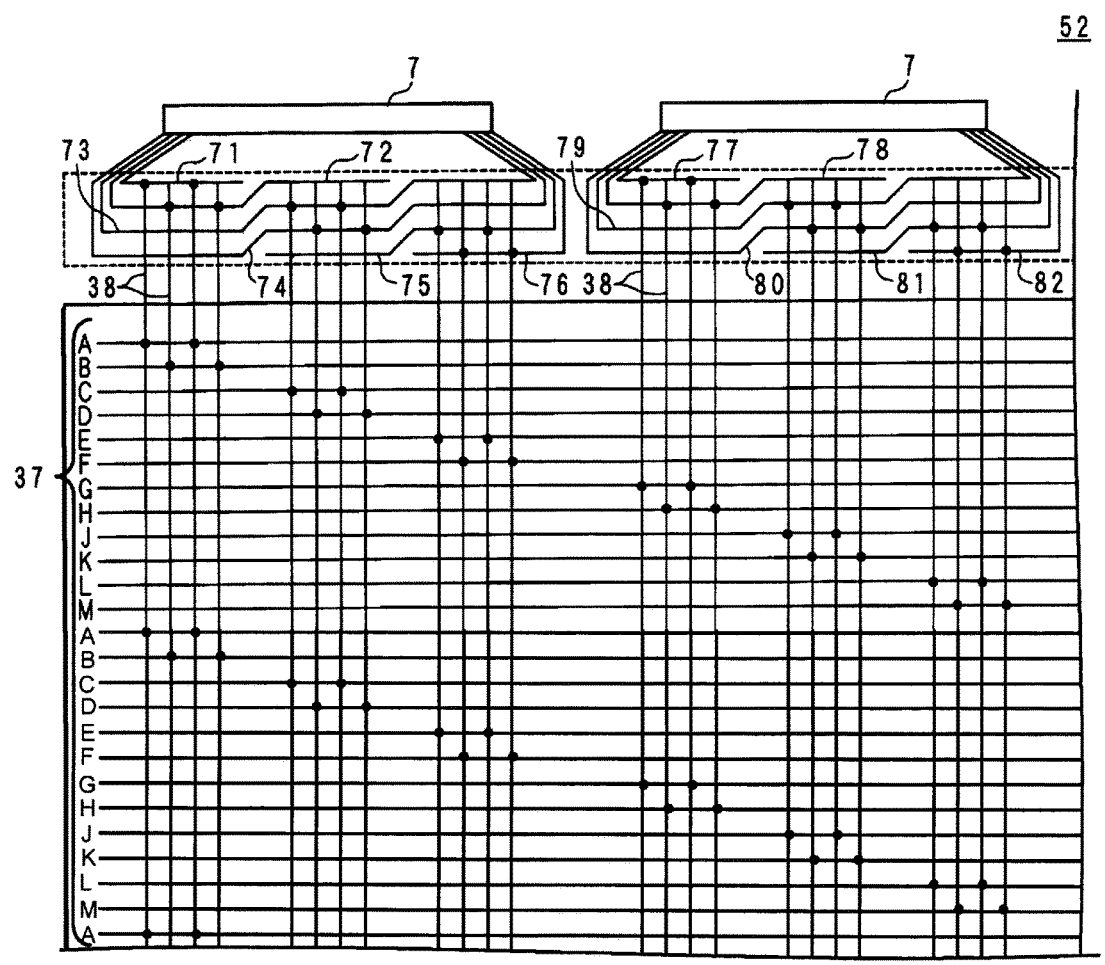
FIG. 6 is an explanatory diagram schematically showing a connection structure between storage capacitor lines, branch lines, and trunk lines of the display panel according to Embodiment 1 of the present invention.

FIG. 6 is an explanatory diagram schematically showing a connection structure between storage capacitor lines, branch lines, and trunk lines of the display panel according to Embodiment 1 of the present invention.

As shown in FIG. 6, storage capacitor lines 37 each belonging to one of 12 groups A, B, C, D, E, F, G, H, J, K, L and M are arrayed in the column direction. The storage capacitor lines 37 are arrayed so that every twelfth storage capacitor line 37 belongs to the same group.

Branch lines 38 connected to the storage capacitor lines 37 are arrayed in the row direction. Each branch line 38 is connected to more than one of the storage capacitor lines 37 that belong to the same group.

At a column-direction edge of the display panel 52, a plurality of trunk lines 71 to 82 are provided, each supplying an identical signal to a number of storage capacitor lines 37 that belong to one of the 12 groups via one or more branch lines 38.

At a column-direction edge of the display panel 52, a plurality of storage capacitor signal control sections (signal sending sections) 7 are provided. The storage capacitor signal control sections 7 send out signals on a block-by-block basis. In other words, each storage capacitor signal control section 7 is connected to associated trunk lines among the trunk lines 71 to 82, and sends out signals thereon. Trunk lines associated with each storage capacitor signal control section 7 constitute one block.

In this example, the number of trunk lines associated with each storage capacitor signal control section 7 is six, and the total number of storage capacitor signal control sections 7 that are coupled to the storage capacitor lines 37 belonging to the 12 groups is two. Six groups are associated with each storage capacitor signal control section 7. The left storage capacitor signal control section 7 in FIG. 6 is coupled to the trunk lines 71 to 76, whereas the right storage capacitor signal control section 7 in FIG. 6 is coupled to the trunk lines 77 to 82.

The associated trunk lines coupled to each storage capacitor signal control section 7 include a plurality of subsections in each of which mutually different trunk lines are arrayed in the column direction. In each of the plurality of subsections, two or more of the branch lines 30 that are connected to storage capacitor lines 37 belonging to respectively different groups are connected to corresponding trunk lines. The two or more branch lines 38 constitute a unit that corresponds to the respective subsection.

For each storage capacitor signal control section 7, the plural units of the two or more branch lines 38 that are coupled thereto are respectively connected to storage capacitor lines 37 belonging to different sets of groups, as follows.

For each storage capacitor signal control section 7, the plurality of subsections are consecutively designated as a first subsection, a second subsection, and a third subsection in the row direction. In the first subsection of the storage capacitor signal control section 7 of the first block in FIG. 6 (i.e., the left storage capacitor signal control section 7 in FIG. 6), four branch lines 38 that are connected to the storage capacitor lines 37 belonging to group A or B compose Unit 1. In the second subsection of the storage capacitor signal control section 7 of the first block, four branch lines 38 that are connected to the storage capacitor lines 37 belonging to group C or D compose Unit 2. In the third subsection of the storage capacitor signal control section 7 of the first block, four branch lines 38 that are connected to the storage capacitor lines 37 belonging to group E or F compose Unit 3.

Units 1, 2 and 3 are coupled to the storage capacitor signal control section 7 of the first block. Units 1 to 3 are respectively composed of branch lines 38 that are connected to storage capacitor lines 37 belonging to different sets of groups.

Similarly, in the first subsection of the storage capacitor signal control section 7 of the second block in FIG. 6 (i.e., the right storage capacitor signal control section 7 in FIG. 6), four branch lines 38 that are connected to the storage capacitor lines 37 belonging to group G or H compose Unit 4. In the second subsection of the storage capacitor signal control section 7 of the second block, four branch lines 38 that are connected to the storage capacitor lines 37 belonging to group J or K compose Unit 5. In the third subsection of the storage capacitor signal control section 7 of the second block, four branch lines 38 that are connected to the storage capacitor lines 37 belonging to group L or M compose Unit 6.

Units 4, 5 and 6 are coupled to the storage capacitor signal control section 7 of the second block. Units 4 to 6 are respectively composed of branch lines 38 that are connected to storage capacitor lines 37 belonging to different sets of groups.

In this example, the branch lines 38 connected to the storage capacitor lines 37 belonging to the 12 groups constitute a tonal of six units. Meanwhile, the plural units of the two or more branch lines 38 that are coupled to each storage capacitor signal control section 7 are three units.

In this example, the two or more branch lines 38 composing each of Units 1 to 6 include two branch lines 38 chat are connected to storage capacitor lines 37 belonging to one of the 12 groups. For example, Unit 1 is composed of two branch lines 38 that are connected to storage capacitor lines 37 belonging to group A and two branch lines 38 that are connected to storage capacitor lines 37 belonging to group B. The same is true of other Units 2 to 6.

At one end of the row direction of the storage capacitor signal control section 7 of the first block in FIG. 6, the trunk lines 71, 72, 73 and 74 are coupled so as to adjoin one another in the column direction; at the other end, the trunk lines 73, 74, 75 and 76 are coupled so as to adjoin one another in the column direction. Each of the trunk lines 73 and 74 is coupled to the storage capacitor signal control section 7 at both ends.

In the first subsection of the storage capacitor signal control section 7 of the first block, the trunk lines 71, 72, 73 and 74 adjoin one another in the column direction; in the second subsection, the trunk lines 72, 73, 74 and 75 adjoin one another in the column direction; and in the third subsection, the trunk lines 73, 74, 75 and 76 adjoin one another in the column direction.

The trunk lines adjoining one another in the column direction in each or the plurality of subsections are consecutively designated as a first line portion, a second line portion, a third line portion, and a fourth line portion in the column direction. Then, the first line portion, the second line portion, the third line portion, and the fourth line portion in the first subsection are respectively parts of the trunk lines 71, 72, 73 and 74; the first line portion, the second line portion, the third line portion, and the fourth line portion in the second subsection are respectively parts of the trunk lines 72, 73, 74 and 75; and the first line portion, the second line portion, the third line portion, and the fourth line portion in the third subsection are respectively parts of the trunk lines 73, 74, 75 and 76.

The second line portion in the first subsection and the first line portion in the second subsection are parts of the same trunk line (trunk line 72); the third line portion in the first subsection, the second line portion in the second subsection, and the first line portion in the third subsection are parts of the same trunk line (trunk line 73); the fourth line portion in the first subsection, the third line portion in the second subsection, and the second line portion in the third subsection are parts of the same trunk line (trunk line 74); and the fourth line portion in the second subsection and the third, line portion in the third subsection are parts of the same trunk line (trunk line 75).

The first line portions in the first subsection, the second subsection, and the third subsection adjoin in the row direction; the second line portions in the first subsection, the second subsection, and the third subsection adjoin in the row direction; the third line portions in the first subsection, the second subsection, and the third subsection adjoin in the row direction; and the fourth line portions in the first subsection, the second subsection, and the third subsection adjoin in the row direction.

In the first subsection, the trunk line 71 is connected to two branch lines 38 that are connected to storage capacitor lines 37 belonging to group A, among the branch lines 38 composing Unit 1; and the trunk line 72 is connected to two branch lines 38 that are connected to storage capacitor lines 37 belonging to group B, among the branch lines 38 composing Unit 1. The branch lines 38 connected to storage capacitor lines 37 belonging to group A and the branch line 38 connected to storage capacitor lines 37 belonging to group B alternate in the row direction.

In the second subsection, the trunk line 73 is connected to two branch lines 38 that are connected to storage capacitor lines 37 belonging to group C, among the branch lines 38 composing Unit 2; and the trunk line 74 is connected to two branch lines 38 that are connected to storage capacitor lines 37 belonging to group D, among the branch lines 38 composing Unit 2. The branch lines 38 connected to storage capacitor lines 37 belonging to group C and the branch lines 38 connected to storage capacitor lines 37 belonging to group D alternate in the row direction.

In the third subsection, the trunk line 75 is connected to two branch lines 38 that are connected to storage capacitor lines 37 belonging to group E, among the branch lines 38 composing Unit 3; and the trunk line 76 is connected to two branch lines 38 that are connected to storage capacitor lines 37 belonging to group F, among the branch lines 38 composing Unit 3. The branch line 38 connected to storage capacitor lines 37 belonging to group E and the branch lines 38 connected to storage capacitor lines 37 belonging to group F alternate in the row direction.

In each of the first subsection, the second subsection, and the third subsection, four trunk lines adjoin one another in the column direction. The four branch lines 38 composing each of Units 1 to 3 each intersect four trunk lines.

In the storage capacitor signal control section 7 of the second block, too, through a similar manner of connection to that in the storage capacitor signal control section 7 of the first block, the trunk lines 77 to 82, the branch lines 38, and the storage capacitor lines 37 are coupled.

In a similar manner to the storage capacitor signal control section 7 of the first block, at one end of the storage capacitor signal control section 7 of the second block, the trunk lines 77, 78, 79 and 80 are coupled; at the other end, the trunk lines 79, 80, 01 and 32 are coupled.

In the first subsection, the trunk line 77 is connected to two branch lines 38 that are connected to storage capacitor lines 37 belonging to group G among the branch lines 38 composing Unit 4; and the trunk line 78 is connected to two branch lines 38 that are connected to storage capacitor lines 37 belonging to group H, among the branch lines 38 composing Unit 4.

In the second subsection, the trunk line 79 is connected to two branch lines 38 that are connected, to storage capacitor lines 37 belonging to group J, among the branch lines 38 composing Unit 5; and the trunk line 80 is connected to two branch lines 38 that are connected to storage capacitor lines 37 belonging to group K, among the branch lines 38 composing Unit 5.

In the third subsection, the trunk line 81 is connected to two branch lines 38 that are connected to storage capacitor lines 37 belonging to group L, among the branch lines 38 composing Unit 6; and the trunk line 82 is connected to two branch lines 38 that are connected to storage capacitor lines 37 belonging to group M, among the branch lines 38 composing Unit 6.

The four branch lines 38 composing each of Units 4 to 6 each intersect four trunk lines.

The display panel 52 according to the present embodiment has the above-described construction, where not trunk lines corresponding to all groups are arrayed in the column direction; rather, a plurality of subsections exist, in each of which mutually different trunk lines (that correspond to fewer than all groups) are arrayed in the column direction. As a result, the number of trunk lines that arrayed in the column direction is decreased, and thus the footprint of the trunk lines (i.e., the width of the region in which they are installed) can be reduced for a narrow-frame construction, while introducing a greater variety (as many as 12 groups) of storage capacitor signals to suppress waveform blunting.

In a comparison between the display panel of Patent Document 1 and the display panel 52 of one present embodiment, the number of connecting points to input a signal from, the branch lines 38 to the respective storage capacitor lines 37 within the pixel region is the same. Therefore, the loads on the trunk lines are substantially similar to those in the display panel of Patent Document 1, and waveform blunting of signals to the respective storage capacitors Cs is suppressed, just as in the display panel of Patent Document 1.

Furthermore, among the branch lines composing each unit, the number of branch lines that are connected to a storage capacitor line belonging to any one of the plurality of groups is small (e.g., two herein), whereby display unevenness due to delays of storage capacitor signals can be suppressed for the following reasons.

In the display panel of the present embodiment, the two blocks shown in FIG. 6 (which may be referred to as "one cycle") are repeatedly placed in similar structural units. Thus, each storage capacitor line 37 receives signals which are supplied from the two branch lines 38 of each cycle. Therefore, the storage capacitor of each pixel basically receives signals supplied from two branch lines 38 on the right side and two branch lines 38 on the left side. However, this may not be true of the rightmost and leftmost cycles (along the right-left direction) of the display panel, where there may be pixels whose storage capacitors receive signals which are supplied from only the right or left two branch lines 38. For example, regarding the leftmost cycle of the display panel, among the pixels that are to the left of the branch lines 38 composing Unit 6 (i.e., ⅚ cycles of pixels), the storage capacitors connected to the storage capacitor lines 37 belonging to group L or M only receive signals supplied from their right side. As the number of branch lines 38 composing one cycle increases, such delays of storage capacitor signals will become more outstanding, whereby display unevenness may occur. By reducing the number of branch lines 38 composing one cycle, display unevenness due to delays of storage capacitor signals can be suppressed.

Furthermore, under the aforementioned arrangement of trunk lines in each block, in each of the plurality of subsections, the number of trunk lines adjoining one another in the column direction is four, which is smaller than the number of groups, i.e., six, that are associated with one block (or the number of trunk lines constituting one block, i.e., six). As a result, the footprint of the trunk lines can be reduced.

Moreover, the number of trunk lines intersected by the branch lines composing each unit in the block as always four, whereby all groups can be equalized in capacitance.

Embodiment 2

A display panel 58 according to Embodiment 2 of the present invention is similar in construction to the display panel 52 of Embodiment 1, except for a different manner of connection of the trunk lines to the storage capacitor signal control sections 7.

Figure 7:
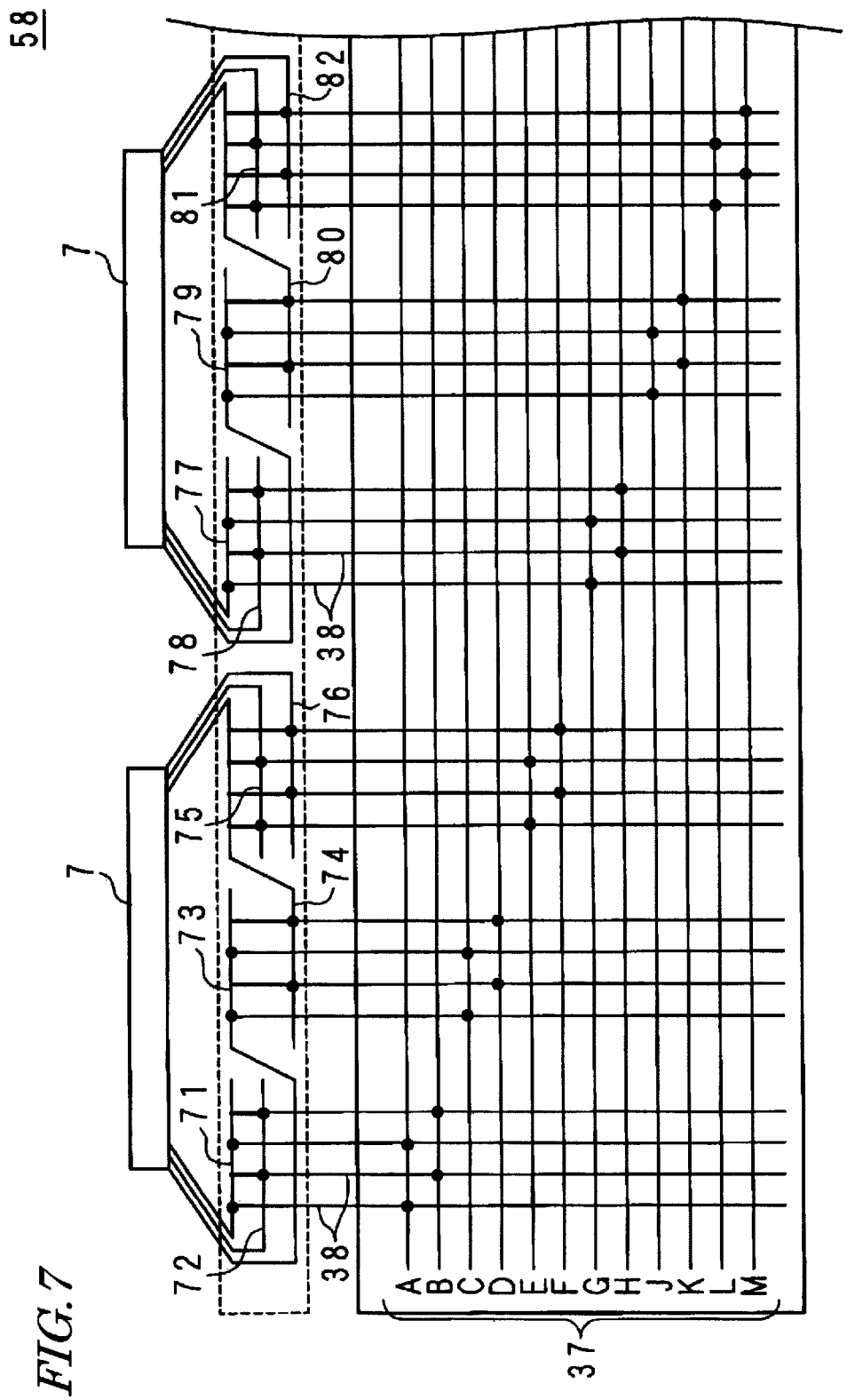
FIG. 7 is an explanatory diagram schematically showing a connection structure between storage capacitor lines, branch lines, and trunk lines of a display panel according to Embodiment 2 of the present invention.

FIG. 7 is an explanatory diagram schematically showing a connection structure between storage capacitor lines, branch lines, and trunk lines of the display panel 58 according to Embodiment 2 of the present invention.

At one end of the storage capacitor signal control section 7 of the first block in FIG. 7 (i.e., the left storage capacitor signal control section 7 in FIG. 7), the trunk lines 71, 72 and 73 are coupled so as to adjoin one another in the column direction; at the other end, the trunk lines 74, 75 and 76 are coupled so as to adjoin one another in the column direction.

In the first subsection of the storage capacitor signal control section 7 of the first block, the trunk lines 71, 72 and 73 adjoin one another in the column direction; in the second subsection, the trunk lines 73 and 74 adjoin each other in the column direction; and in the third subsection, the trunk lines 74, 75 and 76 adjoin one another in the column direction.

The trunk lines adjoining one another in the column direction in each of the first subsection and the third subsection are consecutively designated as a first line portion, a second line portion, and a third line portion in the column direction; and the trunk lines adjoining one another in the column direction in the second subsection are consecutively designated as a first line portion and a second line portion in the column direction. Then, the first line portion, the second line portion, and the third line portion in the first subsection are respectively parts of the trunk lines 71, 72 and 73; the first line portion and the second line portion in the second subsection are respectively parts of the trunk lines 73 and 74; and the first line portion, the second line portion, and the third line portion in the third subsection are respectively parts of the trunk lines 74, 75 and 76.

The first line portion in the second subsection and the third line portion in the first subsection are parts of the same trunk line (trunk line 73). The first line portion in the second subsection and the first line portion in the first subsection adjoin in the row direction. The second line portion in the second subsection and the first line portion in the third subsection are parts of the same trunk line (trunk line 74). The second line portion in the second subsection and the third line portion in the third subsection adjoin in the row direction.

In the first subsection, the trunk line 71 is connected to two branch lines 38 that are connected to storage capacitor lines 37 belonging to group A, among the branch lines 38 composing Unit 1; and the trunk line 72 is connected to two branch lines 38 that are connected to storage capacitor lines 37 belonging co group B, among the branch lines 38 composing Unit 1. The branch lines 38 connected to storage capacitor lines 37 belonging to group A and the branch line 38 connected to storage capacitor lines 37 belonging to group B alternate in the row direction.

In the second subsection, the trunk line 73 is connected to two branch lines 38 that are connected to storage capacitor lines 37 belonging to group C, among the branch lines 38 composing Unit 2; and the trunk line 74 is connected to two branch lines 38 that are connected to storage capacitor lines 37 belonging to group D, among the branch lines 38 composing Unit 2.

In the third subsection, the trunk line 75 is connected to two branch lines 38 that are connected to storage capacitor lines 37 belonging to group E, among the branch lines 38 composing Unit 3; and the trunk line 76 is connected to two branch lines 38 that are connected, to storage capacitor lines 37 belonging to group F, among the branch lines 38 composing Unit 3.

The number of trunk lines intersected by the four branch lines 33 composing Unit 1 is three; the number of trunk lines intersected by the four branch lines 38 composing Unit 2 is two; and the number of trunk lines intersected by the four branch lines 38 composing Unit 3 is three.

In each of Units 1 to 3, the four branch lines composing the unit each intersect an equal number of trunk lines.

In the storage capacitor signal control section 7 of the second block (i.e., the right storage capacitor signal control section 7 in FIG. 7), too, through a similar manner of connection to that in the storage capacitor signal, control section 7 of the first block, the trunk lines 77 to 82, the branch lines 38, and the storage capacitor lines 37 are coupled.

In a similar manner to the storage capacitor signal control section 7 of the first block, at one end of the storage capacitor signal control section 7 of the second block, the trunk lines 77, 78 and 79 are coupled; at another end, the trunk lines 80, 81 and 82 are coupled.

In the first subsection, the trunk line 77 is connected to two branch lines 38 that are connected to storage capacitor lines 37 belonging to group G among the branch lines 38 composing Unit 4; and the trunk line 78 is connected to two branch lines 38 that are connected to storage capacitor lines 37 belonging to group H, among the branch lines 38 composing Unit 4.

In the second subsection, the trunk line 79 is connected to two branch lines 38 that are connected to storage capacitor lines 37 belonging to group J, among the branch lines 38 composing Unit 5; and the trunk line 80 is connected to two branch lines 38 that are connected to storage capacitor lines 37 belonging to group K, among the branch lines 38 composing Unit 5.

In the third subsection, the trunk line 81 is connected to two branch lines 38 that are connected to storage capacitor lines 37 belonging to group L, among the branch lines 38 composing Unit 6; and the trunk line 32 is connected to two branch lines 33 that, are connected to storage capacitor lines 37 belonging to group Mf among the branch lines 38 composing Unit 6.

The number of trunk lines intersected by the four branch lines 38 composing Unit 4 is three; the number of trunk lines intersected by the four branch, lines 38 composing Unit 5 is two; and the number of trunk lines intersected by the four branch lines 38 composing Unit 6 is three.

In the present embodiment, the number of trunk lines adjoining one another in the column direction is three, whereby the footprint of the trunk lines can be further reduced.

Embodiment 3

A display panel 59 according to Embodiment 3 of the present invention is similar in construction to the display panel 52 of Embodiment 1, except that there are three blocks per cycle.

Figure 8:
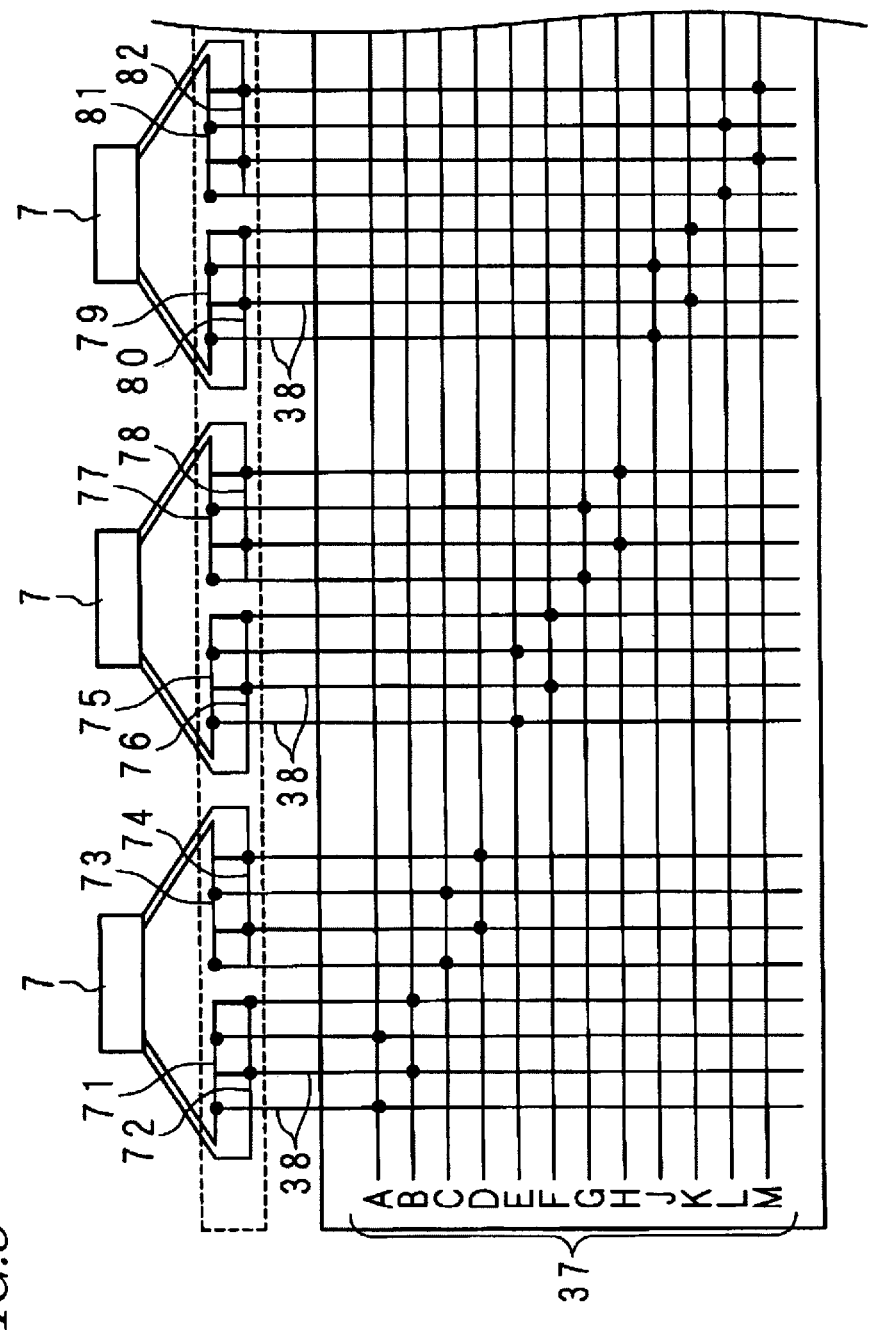
FIG. 8 is an explanatory diagram schematically showing a connection structure between storage capacitor lines, branch lines, and trunk lines of a display panel according to Embodiment 3 of the present invention.

FIG. 8 is an explanatory diagram schematically showing a connection structure between storage capacitor lines, branch lines, and trunk lines of the display panel 59 according to Embodiment 3 of the present invention.

At one end of the storage capacitor signal control section 7 of the first block in FIG. 8 (i.e., the left storage capacitor signal control section 7 in FIG. 8), the trunk lines 71 and 72 are coupled so as to adjoin each other in the column direction; at the other end, the trunk lines 73 and 74 are coupled so as to adjoin each other in the column direction.

In this example, the number of trunk lines associated with each storage capacitor signal control section 7 is four, and the total number of storage capacitor signal control sections 7 that are coupled to the storage capacitor lines 37 belonging to the 12 groups is three. Four groups are associated with each storage capacitor signal control section 7. The left storage capacitor signal control section 7 in FIG. 8 is coupled to the trunk lines 71 to 74; the middle storage capacitor signal control section 7 in FIG. 8 is coupled to the trunk lines 75 to 78; and the right storage capacitor signal control section 7 in FIG. 8 is coupled to the trunk lines 79 to 82.

In each of the storage capacitor signal control sections 7, the plurality of subsections are consecutively designated as a first subsection and a second subsection in the row direction. In the first subsection of the storage capacitor signal control section 7 of the first block in FIG. 8, four branch, lines 38 connected to storage capacitor lines 37 belonging to group A or B compose Unit 1. In the second subsection of the storage capacitor signal control section 7 of the first block, four branch lines 38 connected to storage capacitor lines 37 belonging to group C or D compose Unit 2.

Units 1 and 2 are coupled to the storage capacitor signal control section 7 of the first block. Units 1 and 2 are respectively composed, of branch lines 38 that are connected to storage capacitor lines 37 belonging to different sets of groups.

In the first subsection of the storage capacitor signal control section 7 of the first block, the trunk lines 71 and 72 adjoin each other in the column direction; and in the second subsection, the trunk lines 73 and 74 adjoin each other in the column direction.

The trunk lines adjoining one another in the column direction in each of the first subsection and the second subsection are consecutively designated as a first line portion and a second line portion in the column direction. Then, the first line portion and the second line portion in the first subsection are respectively parts of the trunk lines 71 and 72; and the first line portion and the second line portion in the second subsection are respectively parts of the trunk lines 73 and 74. The first line portions in the first subsection and the second subsection adjoin in the row direction; and the second line portions in the first subsection and the second subsection adjoin in the row direction.

In the first subsection, the trunk line 71 is connected to two branch lines 38 that are connected to storage capacitor lines 37 belonging to group A, among the branch lines 38 composing Unit 1; and the trunk line 72 is connected to two branch lines 38 that are connected to storage capacitor lines 37 belonging to group B, among the branch lines 38 composing Unit 1. The branch lines 38 connected to storage capacitor lines 37 belonging to group A and the branch lines 38 connected to storage capacitor lines 37 belonging to group B alternate in the row direction.

In the second subsection, the trunk line 73 is connected to two branch lines 38 that are connected to storage capacitor lines 37 belonging to group C, among the branch lines 38 composing Unit 2; and the trunk line 74 is connected to two branch lines 38 that are connected to storage capacitor lines 37 belonging to group D, among the branch lines 38 composing Unit 2. The branch lines 38 connected to storage capacitor lines 37 belonging to group C and the branch lines 38 connected to storage capacitor lines 37 belonging to group D alternate in the row direction.

In each of the first subsection and the second subsection, two trunk lines adjoin one another in the column direction. The four branch lines 38 composing each of Units 1 and 2 each intersect two trunk lines.

Herein, the plural units of two or more branch lines 38 that are coupled to each storage capacitor signal control section 7 are two units.

In the storage capacitor signal control section 7 of the second block (i.e., the middle storage capacitor signal control section 7 in FIG. 8), too, through a similar manner of connection to that in the storage capacitor signal control section 7 of the first block, the trunk lines 75 to 78, the branch lines 38, and the storage capacitor lines 37 are coupled. In the storage capacitor signal control section 7 of the third block (i.e., the right storage capacitor signal control section 7 in FIG. 8), too, the trunk lines 79 to 82 are similarly coupled.

In a similar Banner to the first block, at one end of the storage capacitor signal control section 7 of the second block, the trunk lines 75 and 76 are coupled so as to adjoin each other in the column direction; at the other end, the trunk lines 77 and 78 are coupled so as to adjoin each other in the column direction.

In the first subsection, the trunk line 75 is connected to two branch lines 38 that are connected to storage capacitor lines 37 belonging to group E, among the branch lines 38 composing Unit 3. The trunk line 76 is connected to two branch lines 30 that are connected to storage capacitor lines 37 belonging to group F, among the branch lines 38 composing Unit 3.

In the second subsection, the trunk line 77 is connected to two branch lines 38 that are connected to storage capacitor lines 37 belonging to group G, among the branch lines 38 composing Unit 4. The trunk line 78 is connected to two branch lines 38 that are connected to storage capacitor lines 37 belonging to group H, among the branch lines 33 composing Unit 4.

Similarly, at one end of the storage capacitor signal control section 7 of the third block, the trunk lines 79 and 80 are coupled so as to adjoin each other in the column direction; at the other end, the trunk lines 81 and 82 are coupled so as to adjoin each other in the column direction.

In the first subsection, the trunk line 79 is connected to two branch lines 38 that are connected to storage capacitor lines 37 belonging to group J, among the branch lines 38 composing Unit 5; and the trunk line 80 is connected to two branch lines 38 that are connected to storage capacitor lines 37 belonging to group K, among the branch lines 38 composing Unit 5.

In the second subsection, the trunk line 81 is connected to two branch lines 38 that are connected to storage capacitor lines 37 belonging to group L, among the branch lines 38 composing Unit 6; and the trunk line 82 is connected to two branch lines 38 that are connected to storage capacitor lines 37 belonging to group M, among the branch lines 38 composing Unit 6.

The display panel 59 according to the present embodiment has the above-described construction, such that two trunk lines adjoining one another in the column direction. As a result, the footprint of the trunk lines can be further reduced.

Embodiment 4

A display panel 61 according to Embodiment 4 of the present invention differs from the display panel 58 of Embodiment 2 in that the storage capacitor signal control sections 7 are provided at a row-direction edge of the display panel.

Figure 9:
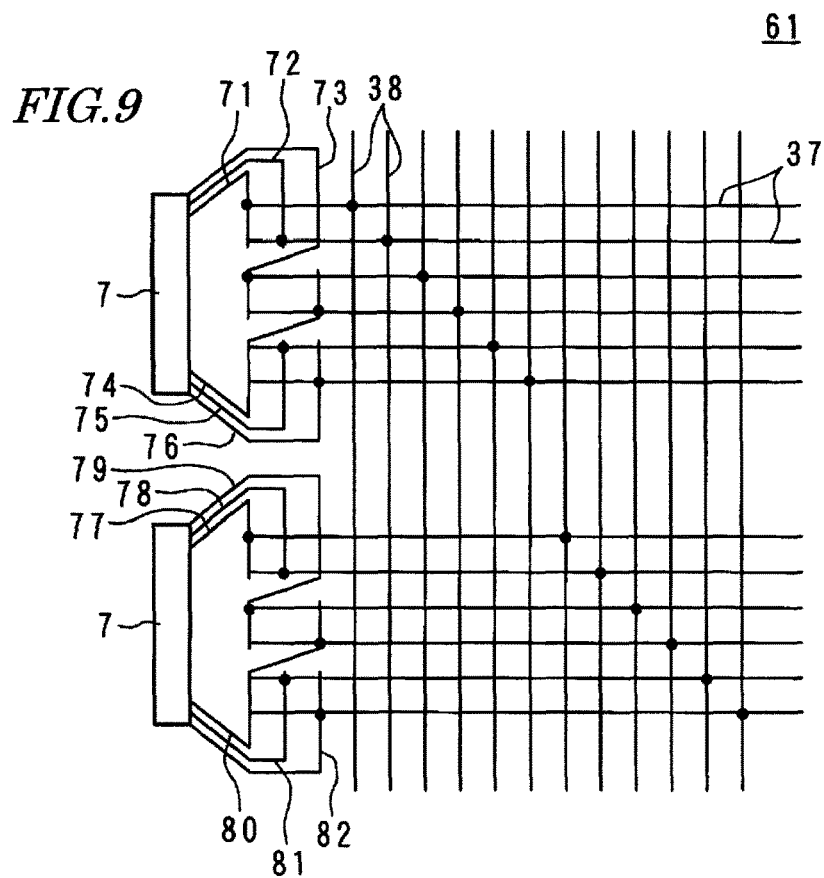
FIG. 9 is an explanatory diagram schematically showing a connection structure between storage capacitor lines, branch lines, and trunk lines of a display panel according to Embodiment 4 of the present invention.
Figure 10:
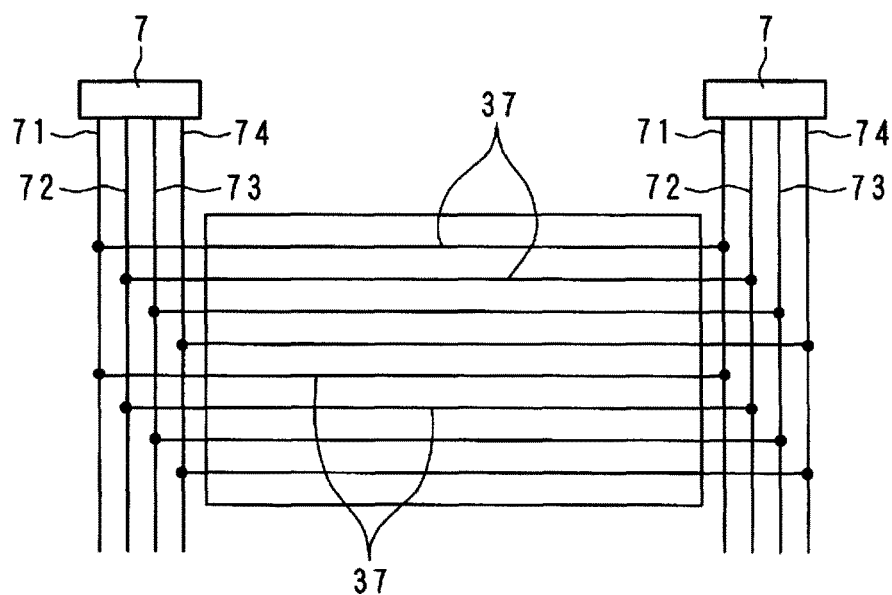
FIG. 10 is an explanatory diagram schematically a connection structure between storage capacitor lines and trunk lines of a conventional display panel.
Figure 11:
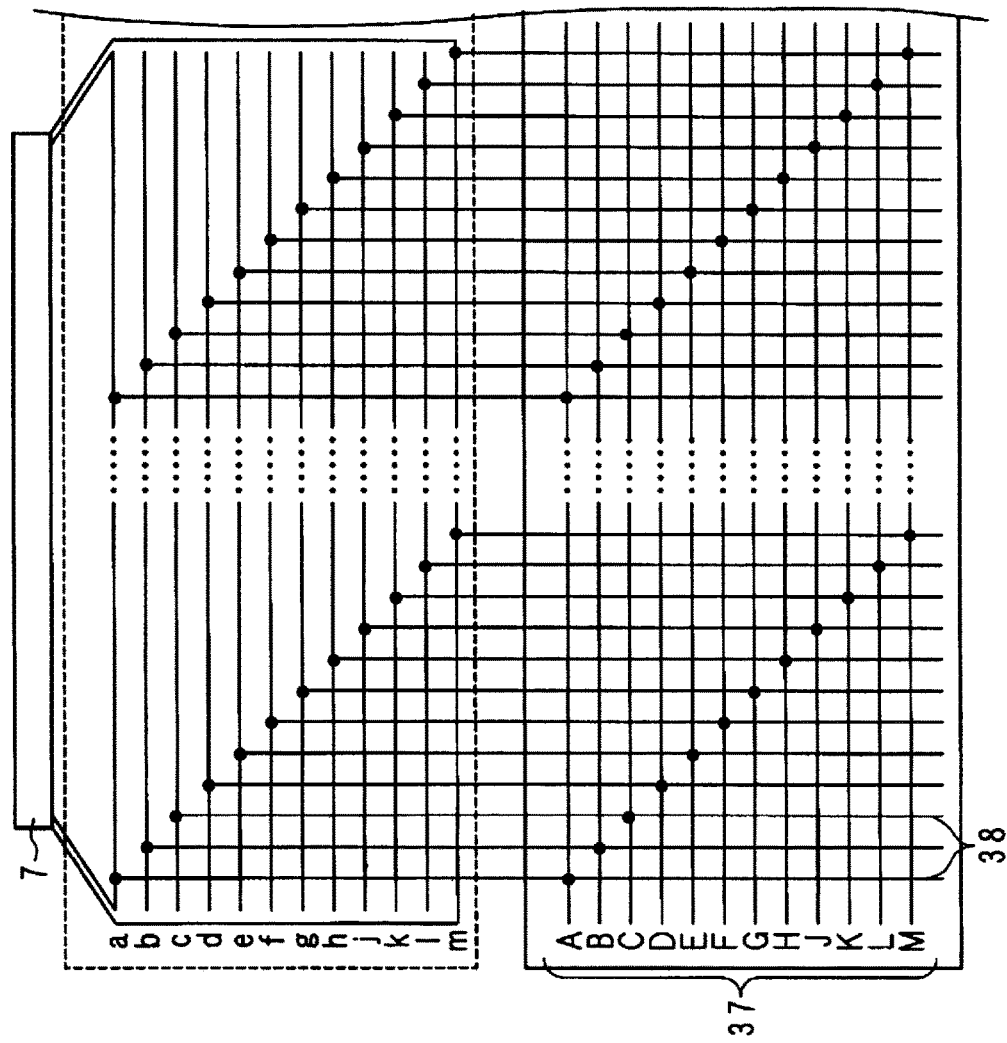
FIG. 11 is an explanatory diagram schematically showing a connection structure between storage capacitor lines, branch lines, and trunk lines of a display panel according to Patent Document 1.

FIG. 9 is an explanatory diagram schematically showing a connection structure between storage capacitor lines, branch lines, and trunk lines of the display panel 61 according to Embodiment 4 of the present invention.

Storage capacitor lines 37 each belonging to one of 12 groups A, B, C, D, E, F, G, H, J, K, L and M are arrayed in the column direction.

At a column-direction edge of the display panel 61, a plurality of trunk lines 71 to 82 are provided, each supplying an identical signal to a number of storage capacitor lines 37 that belong to one of the 12 groups.

In the display panel 61, each trunk line directly (i.e., not by way of any branch lines 38) supplies a signal to a storage capacitor line 37. Each branch line 38 is connected to more than one of the storage capacitor lines 37 that belong to the same group.

At a row-direction edge of the display panel 61, a plurality of storage capacitor signal control sections 7 are arrayed in the column direction. The storage capacitor signal control sections 7 send out signals on a block-by-block basis. In other words, each storage capacitor signal control section 7 is connected to associated trunk lines among the trunk lines 71 to 82, and sends out signals thereon. Trunk lines associated with each storage capacitor signal control section 7 constitute one block.

The associated trunk lines coupled to each storage capacitor signal control section 7 include a plurality of subsections in each of which mutually different trunk lines are arrayed in the row direction. In each of the plurality of subsections, storage capacitor lines 37 belonging to respectively different groups among the 12 groups are connected to corresponding trunk lines.

At one end of the column direction of the storage capacitor signal control section 7 of the first block in FIG. 9 (i.e., the upper storage capacitor signal control section 7 in FIG. 9), the trunk lines 71, 72 and 73 are coupled so as to adjoin in the row direction; at the other end, the trunk lines 74, 75 and 76 are coupled so as to adjoin in the row direction.

In each of the storage capacitor signal control sections 7, the plurality of subsections are consecutively designated as a first subsection, a second subsection, and a third subsection in the column direction.

In the first subsection of the storage capacitor signal control section 7 of the first block in FIG. 9, storage capacitor lines 37 belonging to group A or B are connected to corresponding frank lines. In the second subsection of the storage capacitor signal control section 7 of the first block, storage capacitor lines 37 belonging to croup C or D are connected to corresponding trunk lines. In the third subsection of the storage capacitor signal control section 7 of the first block, storage capacitor lines 37 belonging to group E or F are connected to corresponding trunk lines.

In the first subsection of the storage capacitor signal control section 7 of the first block, the trunk lines 71, 72 and 73 adjoin in the row direction; in the second subsection, the trunk lines 73 and 74 adjoin in the row direction; and in the third subsection, the trunk lines 74, 75 and 76 adjoin in the row direction.

The trunk lines adjoining one another in the row direction in each of the first subsection and the third subsection are consecutively designated as a first line portion, a second line portion, and a third line portion in the row direction; and the trunk lines adjoining each other in the row direction in the second subsection are consecutively designated as a first line portion and a second line portion in the row direction. Then, the first line portion, the second line portion, and the third line portion in the first subsection are respectively parts of the trunk lines 71, 72 and 73; the first line portion and the second line portion in the second subsection are respectively parts of the trunk lines 73 and 74; and the first line portion, the second line portion, and the third line portion in the third subsection are respectively parts of the trunk lines 74, 75 and 76.

The first line portion in the second subsection and the third line portion in the first subsection are parts of the same trunk line (trunk line 73). The first line portion in the second subsection and the first line portion in the first subsection adjoin each other in the column direction. The second line portion in the second subsection and the first line portion in the third subsection are parts of the same trunk line (trunk line 74). The second line portion in the second subsection and the third line portion in the third subsection adjoin each other in the column direction.

In the first subsection, the trunk line 71 is connected to one of the storage capacitor lines 37 belonging to group A; and the trunk line 72 is connected to one of the storage capacitor lines 37 belonging to group B.

In the second subsection, the trunk line 73 is connected to one of the storage capacitor lines 37 belonging to group C; and the trunk line 74 is connected to one of the storage capacitor lines 37 belonging to group D.

In the third subsection, the trunk line 75 is connected to one of the storage capacitor lines 37 belonging to group E; and the trunk line 76 is connected to one of the storage capacitor lines 37 belonging to group F.

In the first subsection, the number of trunk lines intersected by the two storage capacitor lines 37 is three; in the second subsection, the number of trunk lines intersected by the two storage capacitor lines 37 is two; in the third subsection, the number of trunk lines intersected by the two storage capacitor lines 37 is three.

At one end of the column direction of the storage capacitor signal control section 7 of the second block in FIG. 9 (i.e., the lower storage capacitor signal control section 7 in FIG. 9), the trunk lines 77, 78 and 79 are coupled so as to adjoin in the row direction; at the other end, the trunk lines 80, 81 and 82 are coupled so as to adjoin in the row direction.

In the first subsection, the trunk line 77 is connected to one of the storage capacitor lines 37 belonging to group G; and the trunk line 78 is connected to one of the storage capacitor lines 37 belonging to group H.

In the second subsection, the trunk line 78 is connected to one of the storage capacitor lines 37 belonging to group J; and the trunk line 80 is connected to one of the storage capacitor lines 37 belonging to group K.

In the third subsection, the trunk line 81 is connected to one of the storage capacitor lines 37 belonging to group L; and the trunk line 82 is connected to one of the storage capacitor lines 37 belonging to group M.

In the present embodiment, as opposed to a construction where trunk lines corresponding to all groups are arrayed in the row direction, a plurality of subsections exist, in each of which mutually different trunk lines (that correspond to fewer than all groups) are arrayed in the row direction. As a result, the number of trunk lines that are arrayed in the row direction is decreased, and thus the footprint of the trunk lines can be reduced while introducing a greater variety of storage capacitor signals to suppress waveform blunting. Thus, a narrow-frame construction is made possible for the display panel 61.

In all aspects, the embodiments disclosed herein should be considered as illustrative, rather than restrictive. The scope of the present invention, which is represented by the claims rather than the foregoing description, is intended to encompass all possible changes within the meaning and range of equivalence of the claims.

For example, the number of groups of storage capacitor lines is not limited to twelve, but may be six. In this case, one cycle may consist of one block including three units, for example. Alternatively, the number of groups may be four, in which case one cycle may consist of one block including two units, for example.

What is claimed is:

1. A liquid crystal display panel comprising:
   storage capacitors respectively provided for a plurality of pixels arranged in a matrix shape on a substrate;
   a plurality of storage capacitor lines arrayed in a column direction and each connected to corresponding ones of the storage capacitors, each storage capacitor line belonging to one of N groups (where N is an integer equal to or greater than 2), such that every $N^{th}$ storage capacitor line belongs to an identical group;
   a plurality of branch lines arrayed in a row direction, each branch line being connected to more than one of the plurality of storage capacitor lines that belong to the identical group;
   a plurality of trunk lines at a column-direction edge of the substrate, each supplying an identical signal to a number of storage capacitor lines that belong to one of the N groups via one or more of the plurality of branch lines; and
   a plurality of signal sending sections each being coupled to associated trunk lines among the plurality of trunk lines, wherein,
   the plurality of signal sending sections include at least two signal sending sections, the associated trunk lines coupled to each of which are connected to storage capacitor lines belonging to different ones of the N groups;
   the associated trunk lines coupled to each of the plurality of signal sending sections include a plurality of subsections in each of which mutually different trunk lines are arrayed in the column direction;
   in each of the plurality of subsections, two or more of the plurality of branch lines that are connected to storage capacitor lines belonging to respectively different identical groups are connected to one or more of the associated trunk lines, the two or more branch lines constituting a unit that corresponds to the respective subsection; and
   for each of the plurality of signal sending sections, the plural units of the two or more branch lines that are coupled thereto are respectively connected to storage capacitor lines belonging to different sets of identical groups.

2. The liquid crystal display panel of claim 1, wherein there are fewer trunk lines adjoining one another in the column direction in each of the plurality of subsections than there are the associated trunk lines coupled to each of the plurality of signal sending sections.

3. The liquid crystal display panel of claim 1, wherein,
   the N groups are 12 groups;
   the plural units are three units, and the branch lines connected to the storage capacitor lines belonging to the 12 groups constitute a total of six units; and
   the associated trunk lines coupled to each of the plurality of signal sending sections are six associated trunk lines, and the plurality of signal sending sections coupled to the storage capacitor lines belonging to the 12 groups are two signal sending sections.

4. The liquid crystal display panel of claim 1, wherein, the N groups are 12 groups;
the plural units are two units, and the branch lines connected to the storage capacitor lines belonging to the 12 groups constitute a total of six units; and
the associated trunk lines coupled to each of the plurality of signal sending sections are four associated trunk lines, and the plurality of signal sending sections coupled to the storage capacitor lines belonging to the 12 groups are three signal sending sections.

5. The liquid crystal display panel of claim 1, wherein the two or more branch lines composing each of the plural units each intersect an equal number of trunk lines.

6. The liquid crystal display panel of claim 1, wherein all of the branch lines composing the plural units each intersect an equal number of trunk lines.

7. The liquid crystal display panel of claim 1, wherein the two or more branch lines composing each of the plural units include two branch lines that are connected to storage capacitor lines belonging to one of the N groups.

8. The liquid crystal display panel of claim 1, wherein the plurality of storage capacitor lines include a plurality of sets which are arrayed in the column direction, such that storage capacitor lines respectively belonging to the N groups are arrayed in a predetermined order in each of the plurality of sets.

9. The liquid crystal display panel of claim 8, wherein the two or more branch lines composing each of the plural units are connected to two or more consecutive storage capacitor lines in each of the plurality of sets.

10. A liquid crystal display panel comprising:
storage capacitors respectively provided for a plurality of pixels arranged in a matrix shape on a substrate;
a plurality of storage capacitor lines arrayed in a column direction and each connected to corresponding ones of the storage capacitors, each storage capacitor line belonging to one of N groups (where N is an integer equal to or greater than 2), such that every $N^{th}$ storage capacitor line belongs to an identical group;
a plurality of branch lines arrayed in a row direction, each branch line being connected to more than one of the plurality of storage capacitor lines that belong to the identical group;
a plurality of trunk lines at a column-direction edge of the substrate, each supplying an identical signal to a number of storage capacitor lines that belong to one of the N groups via one or more of the plurality of branch lines; and
a plurality of signal sending sections each being coupled to associated trunk lines among the plurality of trunk lines, wherein,
the associated trunk lines coupled to each of the plurality of signal sending sections include a plurality of subsections in each of which mutually different trunk lines are arrayed in the column direction;
in each of the plurality of subsections, two or more of the plurality of branch lines that are connected to storage capacitor lines belonging to respectively different identical groups are connected to one or more of the associated trunk lines trunk lines, the two or more branch lines constituting a unit that corresponds to the respective subsection; and
for each of the plurality of signal sending sections, the plural units of the two or more branch lines that are coupled thereto are respectively connected to storage capacitor lines belonging to different sets of identical groups,
wherein, the N groups are 12 groups;
the plural units are three units, and the branch lines connected to the storage capacitor lines belonging to the 12 groups constitute a total of six units; and
the associated trunk lines coupled to each of the plurality of signal sending sections are six associated trunk lines, and the plurality of signal sending sections coupled to the storage capacitor lines belonging to the 12 groups are two signal sending sections,
wherein, the trunk lines adjoining one another in the column direction in each of the plurality of subsections are consecutively designated as a first line portion, a second line portion, a third line portion, and a fourth line portion in the column direction, and the plurality of subsections are consecutively designated as a first subsection, a second subsection, and a third subsection in the row direction;
the second line portion in the first subsection and the first line portion in the second subsection are parts of a same trunk line;
the third line portion in the first subsection, the second line portion in the second subsection, and the first line portion in the third subsection are parts of a same trunk line;
the fourth line portion in the first subsection, the third line portion in the second subsection, and the second line portion in the third subsection are parts of a same trunk line;
the fourth line portion in the second subsection and the third line portion in the third subsection are parts of a same trunk line;
the first line portions in the first subsection, the second subsection, and the third subsection adjoin in the row direction;
the second line portions in the first subsection, the second subsection, and the third subsection adjoin in the row direction;
the third line portions in the first subsection, the second subsection, and the third subsection adjoin in the row direction;
the fourth line portions in the first subsection, the second subsection, and the third subsection adjoin in the row direction; and
each branch line composing the plural units intersects four trunk lines.

11. A liquid crystal display panel comprising:
storage capacitors respectively provided for a plurality of pixels arranged in a matrix shape on a substrate;
a plurality of storage capacitor lines arrayed in a column direction and each connected to corresponding ones of the storage capacitors, each storage capacitor line belonging to one of N groups (where N is an integer equal to or greater than 2), such that every $N^{th}$ storage capacitor line belongs to an identical group;
a plurality of branch lines arrayed in a row direction, each branch line being connected to more than one of the plurality of storage capacitor lines that belong to the identical group;
a plurality of trunk lines at a column-direction edge of the substrate, each supplying an identical signal to a number of storage capacitor lines that belong to one of the N groups via one or more of the plurality of branch lines; and a plurality of signal sending sections each being coupled to associated trunk lines among the plurality of trunk lines, wherein, the associated trunk lines coupled to each of the plurality of signal sending sections include a plurality of subsections in each of which mutually different trunk lines are arrayed in the column direction;

in each of the plurality of subsections, two or more of the plurality of branch lines that are connected to storage capacitor lines belonging to respectively different identical groups are connected to one or more of the associated trunk lines trunk lines, the two or more branch lines constituting a unit that corresponds to the respective subsection; and for each of the plurality of signal sending sections, the plural units of the two or more branch lines that are coupled thereto are respectively connected to storage capacitor lines belonging to different sets of identical groups, wherein, the N groups are 12 groups;

the plural units are three units, and the branch lines connected to the storage capacitor lines belonging to the 12 groups constitute a total of six units; and the associated trunk lines coupled to each of the plurality of signal sending sections are six associated trunk lines, and the plurality of signal sending sections coupled to the storage capacitor lines belonging to the 12 groups are two signal sending sections, wherein, the plurality of subsections are consecutively designated as a first subsection, a second subsection, and a third subsection in the row direction;

the trunk lines adjoining one another in the column direction in each of the first subsection and the third subsection are consecutively designated as a first line portion, a second line portion, and a third line portion in the column direction;

the trunk lines adjoining each other in the column direction in the second subsection are consecutively designated as a first line portion and a second line portion in the column direction; and the first line portion in the second subsection and the third line portion in the first subsection are parts of a same trunk line, and the first line portion in the second subsection and the first line portion in the first subsection adjoin in the row direction; and the second line portion in the second subsection and the first line portion in the third subsection are parts of a same trunk line, and the second line portion in the second subsection and the third line portion in the third subsection adjoin in the row direction.

12. A liquid crystal display panel comprising:

storage capacitors respectively provided for a plurality of pixels arranged in a matrix shape on a substrate;

a plurality of storage capacitor lines arrayed in a column direction and each connected to corresponding ones of the storage capacitors, each storage capacitor line belonging to one of N groups (where N is an integer equal to or greater than 2), such that every $N^{th}$ storage capacitor line belongs to an identical group;

a plurality of branch lines arrayed in a row direction, each branch line being connected to more than one of the plurality of storage capacitor lines that belong to the identical group;

a plurality of trunk lines at a column-direction edge of the substrate, each supplying an identical signal to a number of storage capacitor lines that belong to one of the N groups via one or more of the plurality of branch lines; and a plurality of signal sending sections each being coupled to associated trunk lines among the plurality of trunk lines, wherein, the associated trunk lines coupled to each of the plurality of signal sending sections include a plurality of subsections in each of which mutually different trunk lines are arrayed in the column direction;

in each of the plurality of subsections, two or more of the plurality of branch lines that are connected to storage capacitor lines belonging to respectively different identical groups are connected to one or more of the associated trunk lines trunk lines, the two or more branch lines constituting a unit that corresponds to the respective subsection; and for each of the plurality of signal sending sections, the plural units of the two or more branch lines that are coupled thereto are respectively connected to storage capacitor lines belonging to different sets of identical groups, wherein, the N groups are 12 groups;

the plural units are two units, and the branch lines connected to the storage capacitor lines belonging to the 12 groups constitute a total of six units; and the associated trunk lines coupled to each of the plurality of signal sending sections are four associated trunk lines, and the plurality of signal sending sections coupled to the storage capacitor lines belonging to the 12 groups are three signal sending sections, wherein, the trunk lines adjoining each other in the column direction in each of the plurality of subsections are consecutively designated as a first line portion and a second line portion in the column direction, and the plurality of subsections are consecutively designated as a first subsection and a second subsection in the row direction;

the first line portions in the first subsection and the second subsection adjoin in the row direction;

the second line portions in the first subsection and the second subsection adjoin in the row direction; and each branch line composing the plural units intersects two trunk lines.

13. A liquid crystal display panel comprising:

storage capacitors respectively provided for a plurality of pixels arranged in a matrix shape on a substrate;

a plurality of storage capacitor lines arrayed in a column direction and each connected to corresponding ones of the storage capacitors, each storage capacitor line belonging to one of N groups (where N is an integer equal to or greater than 2), such that every $N^{th}$ storage capacitor line belongs to an identical group;

a plurality of branch lines arrayed in a row direction, each branch line being connected to more than one of the plurality of storage capacitor lines that belong to the identical group;

a plurality of trunk lines at a row-direction edge of the substrate, each supplying an identical signal to a number of storage capacitor lines that belong to one of the N groups; and a plurality of signal sending sections each being coupled to associated trunk lines among the plurality of trunk lines, wherein, the plurality of signal sending sections include at least two signal sending sections, the associated trunk lines coupled to each of which are connected to storage capacitor lines belonging to different ones of the N groups;

the associated trunk lines coupled to each of the plurality of signal sending sections include a plurality of subsections in each of which mutually different trunk lines are arrayed in the row direction; and in each of the plurality of subsections, storage capacitor lines belonging to respectively different identical groups among the N groups are connected to one or more of the associated trunk lines.

14. The liquid crystal display panel of claim 13, wherein there are fewer trunk lines adjoining one another in the row direction in each of the plurality of subsections than there are the associated trunk lines coupled to each of the plurality of signal sending sections.

15. The liquid crystal display panel of claim 13, wherein the plurality of storage capacitor lines include a plurality of sets which are arrayed in the column direction, such that storage capacitor lines respectively belonging to the N groups are arrayed in a predetermined order in each of the plurality of sets.

* * * * *

UNITED STATES PATENT AND TRADEMARK OFFICE
CERTIFICATE OF CORRECTION

PATENT NO. : 10,359,675 B2
APPLICATION NO. : 15/700900
DATED : July 23, 2019
INVENTOR(S) : Masahiro Matsuda It is certified that error appears in the above-identified patent and that said Letters Patent is hereby corrected as shown below:

In the Claims

Column 21, Line 63, delete second occurrence of "trunk lines".

Column 23, Line 13, delete second occurrence of "trunk lines".

Column 24, Line 15, delete second occurrence of "trunk lines".

Signed and Sealed this
Thirty-first Day of March, 2020

Andrei Iancu
*Director of the United States Patent and Trademark Office*